United States Patent [19]
Dighe et al.

[11] Patent Number: 5,717,691
[45] Date of Patent: Feb. 10, 1998

[54] MULTIMEDIA NETWORK INTERFACE FOR ASYNCHRONOUS TRANSFER MODE COMMUNICATION SYSTEM

[75] Inventors: Rajiv S. Dighe, Princeton Junction; Zoran Miljanic, Princeton; Dipankar Raychaudhuri, Princeton Junction, all of N.J.

[73] Assignee: NEC USA, Inc., Princeton, N.J.

[21] Appl. No.: 550,330

[22] Filed: Oct. 30, 1995

[51] Int. Cl.$^6$ ................................................. H04L 12/56
[52] U.S. Cl. ........................ 370/401; 370/463; 370/466
[58] Field of Search ................................. 370/389, 392, 370/395, 396, 397, 401, 463, 465, 466, 469, 474, 402

[56] References Cited

U.S. PATENT DOCUMENTS

| | | | |
|---|---|---|---|
| 5,548,587 | 8/1996 | Bailey et al. | 370/395 |
| 5,555,244 | 9/1996 | Gupata et al. | 370/397 |
| 5,594,732 | 1/1997 | Bell et al. | 370/401 |
| 5,617,539 | 4/1997 | Ludwig et al. | 395/200.02 |
| 5,623,495 | 4/1997 | Eng et al. | 370/397 |
| 5,623,605 | 4/1997 | Keshav et al. | 395/200.17 |

FOREIGN PATENT DOCUMENTS

| | | | |
|---|---|---|---|
| 2267625 | 12/1993 | United Kingdom | H04N 7/14 |
| 2280338 | 1/1995 | United Kingdom | H04M 11/06 |
| 9530318 | 11/1995 | WIPO | H04Q 11/04 |
| 9602099 | 1/1996 | WIPO | H04L 12/56 |

OTHER PUBLICATIONS

Stuart Wray et al., "The Medusa Applications Environment," to appear in the Proc. of the Int'l. Conf. On Multimedia Computing and Systems, Boston, MA, May 1994.
Joel F. Adam et al., "A Network Architecture for Distributed Multimedia Systems," in Proc. of IEEE 18th Annual Conf. on Local Computer Networks, Minneapolis, MN, Sep. 1993, pp. 70–76.
NEC MOS Integrated Circuit μPD98401 Local ATM SAR Chip—Preliminary Data Sheet, Jun. 1994.
NEC μPD98402 Local ATM Sonet Framer User's Manual, May 1994.

*Primary Examiner*—Douglas W. Olms
*Assistant Examiner*—Ricky Q. Ngo
*Attorney, Agent, or Firm*—Jeffery J. Brosemer; Arthur J. Torsiglieri

[57] ABSTRACT

A multimedia communications and computer platform that can serve as a network interface card combined with an internal distribution network for a full range of user terminal devices. It includes an interconnection network module that serves to route all incoming and outgoing information by way of high speed buses with value added features for communication protocol acceleration. In particular, attached to the different ports of the network are an ATM module, a communications processor, a media processor and a variety of terminal devices. By migrating processing intensive functions of network protocol termination, media stream distribution and media stream adaptation into the network interface card, there are avoided the bottlenecks of the traditional CPU centric approach to ATM systems.

11 Claims, 7 Drawing Sheets

MULTIMEDIA NETWORK INTERFACE FOR ASYNCHRONOUS TRANSFER MODE COMMUNICATION SYSTEM

FIELD OF THE INVENTION

This invention is related to multimedia communication systems based on Asynchronous Transfer Mode (ATM) network technology, and more particularly to network interface apparatus for use at subscriber premises in such systems.

BACKGROUND OF THE INVENTION

Conventional network interface cards (NICs) for use with first generation ATM networks have performance and functionality restrictions. These conventional NICs typically consist of ATM segmentation and reassembly (SAR) hardware along with input/output (I/O) control logic for attachment to the data bus of user terminal devices, such as personal computers or workstations. In this approach, all communications and media stream handling functions are performed under central processor unit (CPU) control, typically via driver software embedded in the terminal's operating system (OS). While this NIC architecture was satisfactory for earlier generations of networks (such as Ethernet), severe performance bottlenecks are experienced when it is applied to ATM networks that can deliver up to 155 Mbps to the user terminal device. This is because the CPU is required to perform a variety of high-speed network protocol, data movement and media stream adaptation functions, thus resulting in a processing limited system.

Others have recognized the shortcomings of this CPU centric approach and sought approaches to relieve the load on the CPU. One approach proposed by Stuart Wray et al in a paper entitled "The Medusa Applications Environment" (in Proc. of Int'l Conf. on Multimedia Computing and Systems, Boston, Mass., May 1994) is a fully distributed system in which the ATM network itself is used to interconnect various media processing and PC/workstation modules that comprise the user terminal. The interface card design adopted by Wray et al does incorporate a CPU for processing, but does not provide the media switching and adaptation capabilities. Another approach is represented by the VUNET system described by J. F. Adam et al in a paper entitled "Experience with VuNet: A Network Architecture for Distributed Multimedia Systems" (in Proc. of IEEE 18th Annual Conf. on Local Computer Networks, Minneapolis, September 1993, pp. 70–76) in which the interface card incorporates functions required to terminate video applications. This system does incorporate some media-related processing into the NIC, but does not provide the more general multiple media handling, switching and processing.

There accordingly remains a need for a communication platform that overcomes the performance problems associated with the traditional ATM Network Interface Unit (NIU) via a novel distributed functional architecture that is better matched to the full needs of multimedia applications.

SUMMARY OF THE INVENTION

This invention avoids the traditional CPU bottleneck by migrating processing intensive functions of network protocol termination, media stream distribution/switching, and media stream adaptation into a novel network interface card. The main architectural goals that drive this invention are as follows:

Plug and Play Multimedia

All existing media devices can be plugged into this card without any modifications.

Multitasking is inherent to multimedia so the card has to support concurrent media sessions with little throughput degradations.

Interoperability with PCs and Workstations using legacy Operating Systems.

Intelligent networking and media-related features that allow off-loading functions from both the host CPU as well as the network central office.

Ability to operate in a stand-alone mode without a host CPU.

The present invention, to be termed the Multimedia Computer and Communications Platform (MCCP), plays the role of an intelligent network interface card for running multimedia applications on existing workstations, PCs and even residential set-top boxes. The prototype architecture supports a wide range of network-edge products, such as a simple Video On Demand receiver, an advanced multimedia workstation, and a small-scale video server.

The MCCP is designed specifically to handle multimedia traffic at the subscriber premises. This relieves the host CPU from high-speed network and media stream related functions, and at the same time facilitates modular addition of media processing and display devices to the user terminal arrangement. The MCCP may thus be viewed as a "network centric" architectural approach as opposed to the "CPU centric" approach traditionally used in current systems.

The MCCP generally includes:

1. An ATM module that terminates ATM and performs all the ATM functions. This includes AAL support for AAL-1, AAL 3/4, AAL 5 and a new AAL cell-rate shaping and scheduling for multiple traffic classes.

The ATM module takes data from various local devices and puts out valid ATM cells to the network and conversely receives ATM cells from the network, checks for validity, does the adaptation layer processing, and then passes it to a core interconnection network for routing to the various local devices.

2. A Communications processor (CP) module that terminates all the networking functions, such as signaling, transport processing, memory management of the core, network management and control. The CP is expected to interact with Applications Programming Interfaces (APIs) on various local terminal devices as well as the ATM network to negotiate and renegotiate resources and similar housekeeping functions.

3. A Media Processor (MP) module that serves as the interface between streams-oriented data and the network. This includes playout strategies as well as concealment and reconstruction strategies for different media devices. It may also interact with the CP to ensure that the correct bandwidths are allocated for the different streams and renegotiate if its playout buffers (on a per stream basis) start filling up or emptying too soon.

4. A special-purpose network interconnect module, termed the router, that allows various local devices to be attached to the MCCP by high speed buses and provides for full non-blocking connectivity from any port to another. The interconnect fabric also provides some enhanced processing, such as data acceleration, for certain data protocols.

In our illustrative embodiment, the invention advantageously further includes an arrangement for the interconnection network module that allows for a self-configuring interface. This is achieved by its having an internal switching core that is independent of edge local terminal devices and Bus Interface units that can be reprogrammed to specific local devices by implementing them with Field Programmable Gate Arrays (FPGAs) or other suitable reprogrammable devices.

Our illustrative embodiment also includes subsidiary features such as an ATM Adaptation Layer (AAL) engine that allows the user to choose from a multitude of AALs and involves a design that allows complete flexibility in mapping an AAL to a specific Virtual Circuit (VC) as well as scalability in terms of the number of VCs the card can support. The AAL engine also has built-in hardware support for higher level functions, such as video concealment and counters for rate and flow control at the higher layers.

Another subsidiary feature of the illustrative embodiment is a Bus Interface (BI) unit that is flexible in terms of allowing multiple asynchronous buses to be interconnected in the MCCP along with providing hardware assistance for enhanced Communication Protocol Processing, such as data integrity support (checksum or CRC).

The architecture of our novel MCCP is based on the recognition that high-speed network interface functions are central to a new network-based multimedia computer/terminal (in the same way as the CPU currently forms the core of a conventional computer). This motivates development of a multipurpose and high-performance network interface card that can serve as the core of the future ATM terminal. In contrast to existing ATM host interface card architectures that rely on the host CPU for many communication functions, the MCCP concept aims to handle all networking-related tasks and pass application-level data only to media processing devices via a shared memory interface. In this way, application devices and software can be developed with a uniform "local processing" paradigm independent of network specific interfaces (which are often subject to change). Recognizing also that future ATM terminals will generally involve a multiplicity of media processing and display devices, the MCCP incorporates local switching capabilities for routing control information, data packets and media streams to their respective processing or memory element.

Essentially, the hardware design of the invention provides, in an illustrative embodiment, a distributed approach in which a high capacity router connects the ATM interface module to various communications processing and media/data processing modules including advantageously an AAL engine, a communications processor (CP), a media processor (MP), a media playout buffer, a host CPU bus interface and a local multimedia network to which are connected various media devices. Incoming ATM signals are first processed in the ATM module and then routed to the communications processing module. During the processing in the ATM, a virtual circuit is established at the ATM level after which the communications processor handles local control functions within the media processor to set up an appropriate path for the assigned VC through the router to the host CPU in the case of data and to the media devices in the case of media signals. The CP also marshals appropriate protocol and media processing resources available in the form of the AAL engine and the MP adaptations. In general, an ATM multimedia session will involve multiple virtual circuits containing video, audio and data so that the MCCP is required to provide multitasking support through each of the major hardware units mentioned above.

The invention will be better understood from the following more detailed description taken in conjunction with the accompanying drawing.

DETAILED DESCRIPTION OF THE INVENTION

Figure 1:
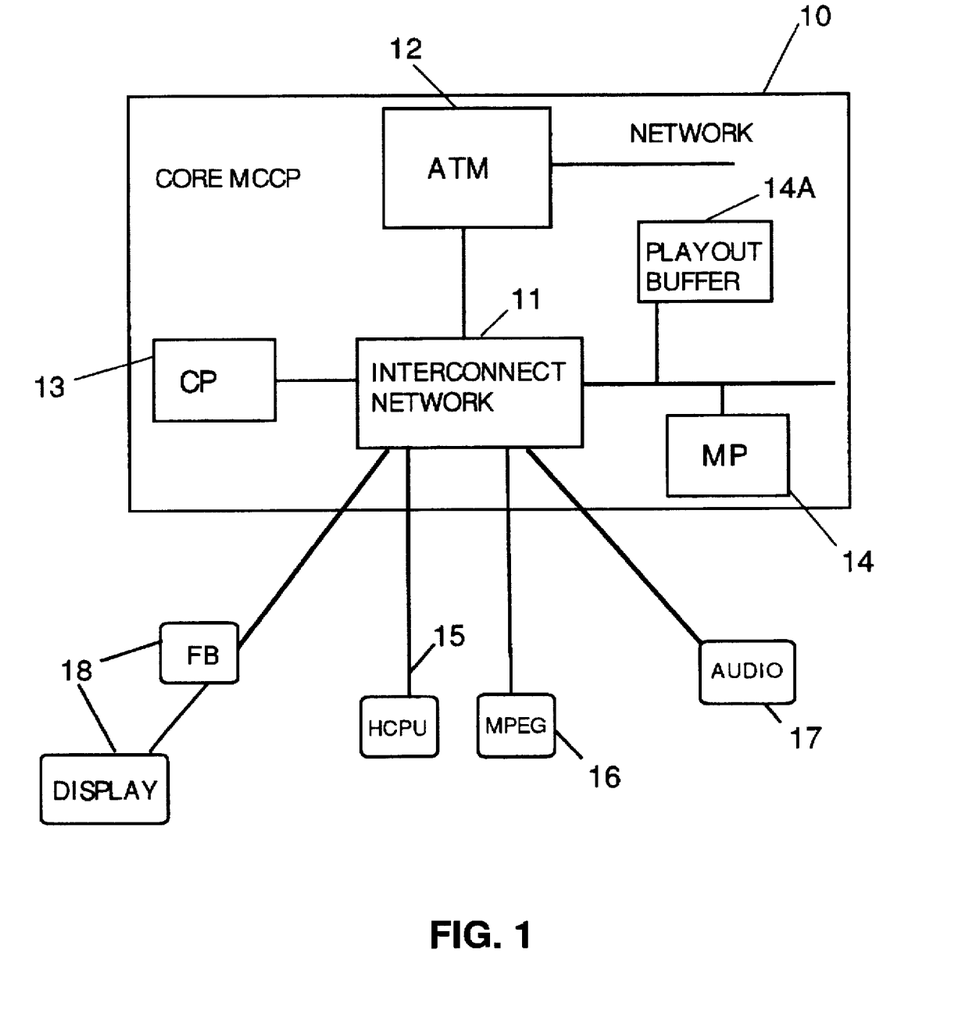
FIG. 1 shows the basic structure of the MCCP in accordance with the invention connected to various multimedia devices.

With reference now to the drawing, FIG. 1, which is illustrative of the invention, shows the basic functional modules of the MCCP 10 together with a variety of common terminal devices connected thereto. The basic components of the MCCP are the local interconnection network module 11, to be termed the router, the ATM module 12 that interfaces with the ATM network, the communications processor module (CP) 13 that manages the various networking functions, and the media processor module (MP) 14 and its associated playout buffer 14A. Also, various user-premises devices, such as a host CPU 15, an MPEG (Motion Picture Export Group) encoder 16, an audio device 17, and a video display 18 with its frame buffer 18, would be coupled to the interconnection network.

Figure 2:
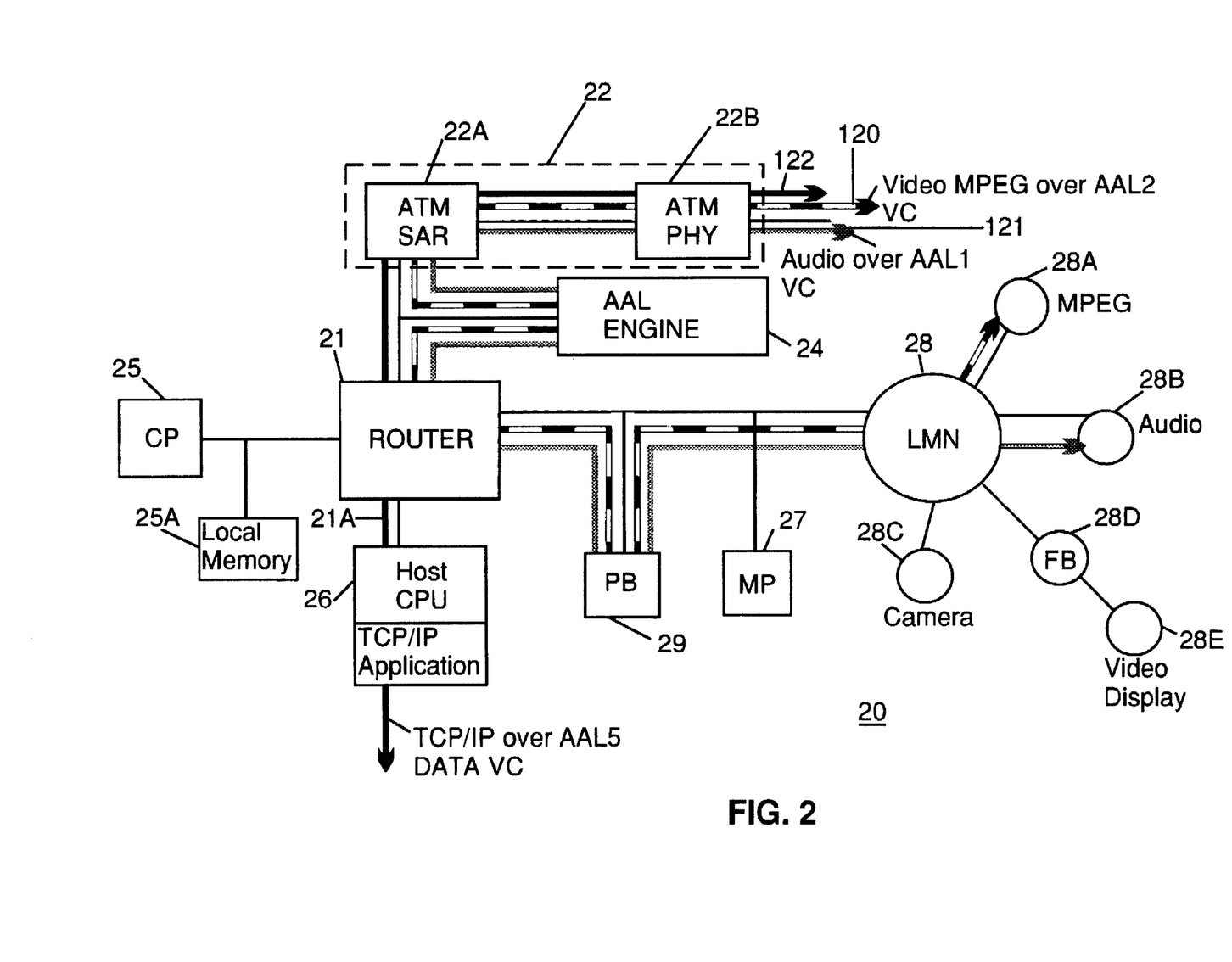
FIG. 2 illustrates schematically the functional architecture of the MCCP and its relation to associated local terminal devices in a system in accordance with the invention.

In FIG. 2, there is shown in greater detail the basic architecture of a typical MCCP connected to various multimedia devices in accordance with the invention. A router 21 serves as the network interconnection module for routing signals between the various modules. More detail of the router 21 will be discussed with reference to FIG. 3.

The ATM module 22 is the interface that takes outgoing data from the various terminal devices and transmits it as valid ATM cells to the ATM network. It also receives incoming ATM cells from the networks, checks these for validity and does the adaptation layer processing. Functions that this module needs to perform are the usual expected of such an interface and include ATM segmentation and reassembly, error checking, cell rate shaping, cell level scheduling, and direct memory access (DMA) to and from various devices.

The ATM module 22 typically includes a chipset including one chip 22A (ATM SAR) to do the segmentation and reassembly (SAR) and another chip 22B (ATM PHY) to do the physical level functions (PHY). Typical chips for these roles include NECEL μP D98401 for the SAR chip and NECEL μP D98402 for the PHY chip. However, the typical ATM SAR chip only supports ATM Adapation Layer (AAL) 5 which is optimized for data transport. In multimedia it is desirable to include multiple AALs, and accordingly advantageously the rest of the AALs desired are implemented on a separate AAL engine chip 24 that is coupled between the router 21 and the ATM SAR 22A.

One of the novel features of our approach is the inclusion of a multimedia AAL. The video AAL advantageously sits under a more generic transport protocol for multimedia called the Multimedia Transport Protocol (MTP). One of the fundamental assumptions behind the MTP is that for some media data, such as video or voice, corrupted data, or blocks of data with gaps in them, is not necessarily data that needs to be thrown away and that proper reconstruction or concealment strategies can restore the original data without having to retransmit. The AAL engine 24 desirably also provides hardware support for the concealment strategies such as deducing the length of a gap in transmission and putting the data in its appropriate address by taking the size of the gap into account. As will be discussed in more detail later, with reference to FIG. 5, a novel feature of the AAL engine is the use of state memory to maintain AAL states for various virtual circuits (VC). This essentially allows for a scalable solution, as the number of VCs that the AAL engine can support is only determined by the amount of address lines on the state memory. Adding the number of VCs in this solution involves adding more memory onto the board. Details of a suitable AAL engine will be described in connection with FIG. 5.

Figure 6:
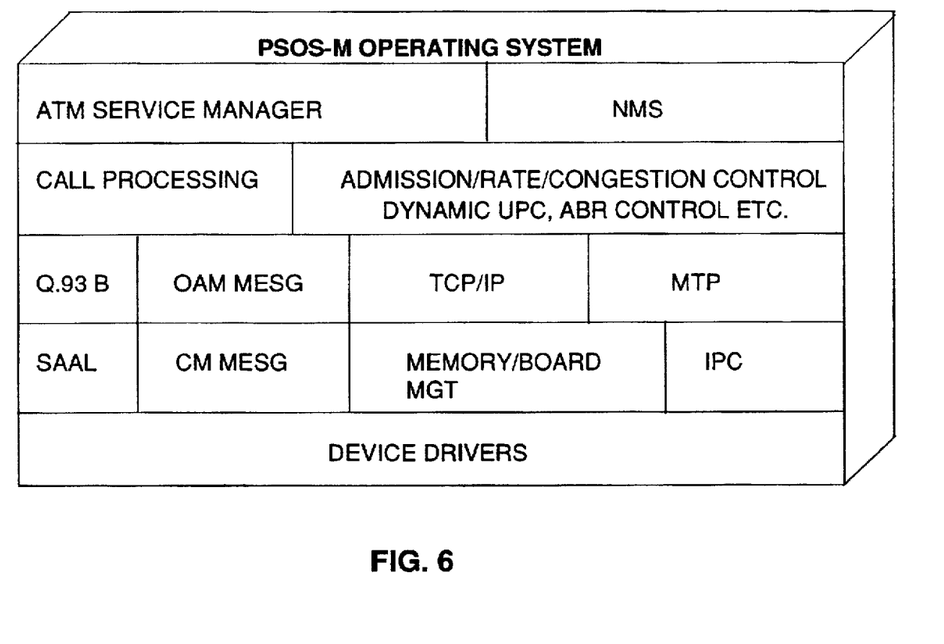
FIG. 6 shows the main functions of the Communication Processor.

The communications processor (CP) 25 with its associated local memory 25A handles all the network related functions as well as the overall management of the MCCP. The CP advantageously serves to offload transport protocols from the host CPU 26, such as TCP/IP or IDP/IP. Some of the functions typically performed by the CP include call-setup signaling and all the necessary functions to load state memory needed for the ATM function as well as the management of data movement from the network to the devices and vice versa. The CP also advantageously sets the knobs for the ATM module so that it can do the fine-grained scheduling of cells for multiple traffic classes. The CP also interacts with the APIs on various devices to renegotiate resources if need be. FIG. 6 is a software stack showing the various roles the communications processor advantageously should provide. Typically, the CP can be an Intel i-960CF processor with four megabytes of local memory using the PSOS-M operating system.

The media processor (MP) 27 is designed to permit all well-known standard media devices, such as video coders using MPEG/JPEG or NTSC formats and audio coder using PCM, to plug into the MCCP with little modification. To this end, desirably the MP utilizes a local multimedia network (LMN) 28 that supplies various multimedia terminal devices, such as an MPEG terminal 28A, an audio device 28B, a camera 28C and a frame buffer 28D with its video display 28E. Moreover, problems that stem from transporting these signals over an ATM network should be hidden from these devices. The MCCP has to smooth out the jitter than inevitably arises in the cell-based asynchronous nature of the stream and the media processor needs to serve this role and to this end includes a playout buffer 29.

The media processor 27 also advantageously can be an Intel i-960CF processor with 4 megabytes of memory which can be used for the playout buffer 29. At setup the MP is programmed to playout to the various multimedia devices by way of each port on the LMN by way of a peripheral component interface bus (PCI).

The MP 27 can be programmed to synchronize and orchestrate the multimedia data and to provide some concealment support for standard codes. The MP advantageously also runs PSOS-M so it can share functions with the CP 25 when needed. The MP also avails itself of clock recovery support from the AAL engine 24 for playing out AAL-1 traffic. The MP advantageously uses the large playout buffer 29 to ensure that it can play the data out at a rate which is controlled by the MP 27. Playout strategies are guided by the device requirements and the worst-case cell delay variation seen in the network. Since some of this is not known a priori, the MP should be able to change the strategies flexibly. The other functions that the MP can perform is synchronization of multimedia data and concealment strategies for display. The MP also needs to interact with the CP to ensure that the correct bandwidths are allocated for the streams. The CP may need to renegotiate if the MP finds its transmit buffers filling up too often or ask for a throttle if its receive buffers start filling up too soon.

Figure 7:
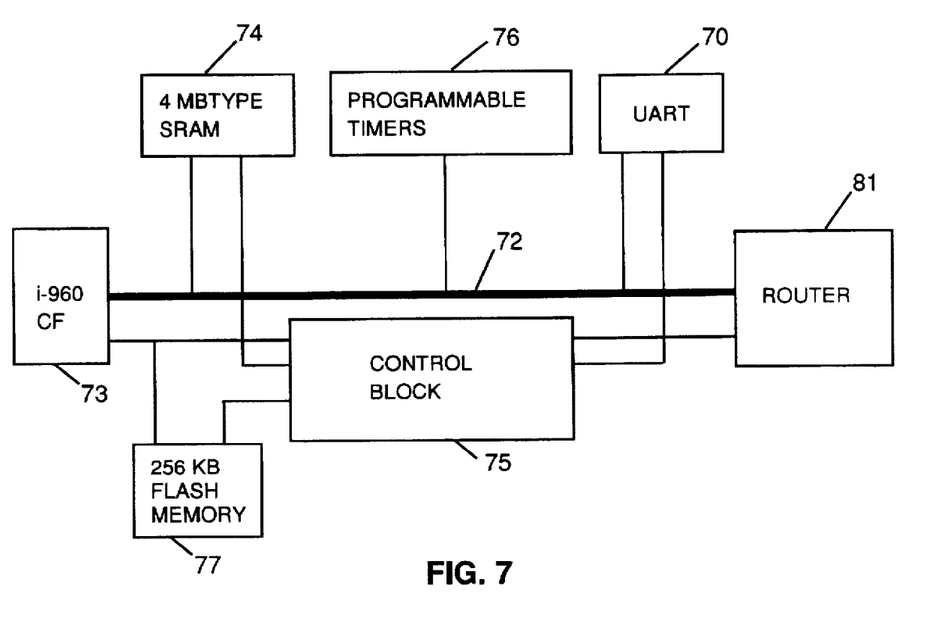
FIG. 7 shows the hardware architecture that can be used for the Communication Processor and the Media Processor.

The basic hardware architecture of both the CP and MP is shown in FIG. 7. Each includes a universal asynchronous receiver-transmitter (UART) 70 for the conversion of parallel to serial and serial to parallel data for use by the associated processor. Each further includes a local bus 72 from the router 81 that is adapted to the i-960CF processor chip 73 together with the 4 megabyte SRAM 74 that serves as the playout buffer in the MP version and as the main memory for the CP version. A control block 75 serves to orchestrate control across the local bus and programmable timers 76 serve as the timing counters for the data. Each one also has a 256 kilobyte flash memory 77 for nonvolotile storage of programs and data.

Returning to FIG. 2, the router 21 is provided with an additional port that includes the S-BUS 21A that leads to the host CPU 26, which for example might be a SPARC workstation.

The most important module of the MCCP for the desired operation of the MCCP is the interconnection network module that essentially comprises the router 21. The desire to make things simple to the user, or premises, terminal-devices requires an intelligent interconnection network. If latency in transferring data from one device to another is critical, then the interconnection network needs to operate in a cut-through fashion with burst-dma operations. It also needs to be a multi-protocol multi-bus device that can interact with various bus protocols and arbitrate requests and grants in a fair fashion. One desirable objective for the MCCP for the future is that it should be a Universal Port. In the Universal Port concept, there is no attempt at preconfiguring the devices that will attach to the network interface card but allows the card to figure out what is attached to it. This allows one to plug in a phone, a PC or a TV to the same port. However, the lack of a common physical medium standard for these devices presently prohibits such a universal device (wireless is being viewed as a possible candidate however). In the MCCP, we attack the problem by noting that even though it will be necessary to have different interfaces to the different devices, the main core of the interconnect network should be device independent. This leads to an interconnection network, or router, in which at its edges there are interfaces that are specific to each device to be attached thereto and in the center there is a core switching fabric that is universal. Moreover, the MCCP can be made to be essentially self-configuring by implementing the interface specific logic of the router 21 in Field-Programmable Gate Arrays (FPGAs), in which case adding a specific interface or replacing one with the other is as simple as retargeting the FPGA. This is equivalent to doing another compile of software. There may remain mechanical issues that should be within the skill of a worker in the art but the ability to retarget the FPGAs and the ability to swap pins to signals are very powerful mechanisms for approaching this notion of a Universal Port.

Figure 3:
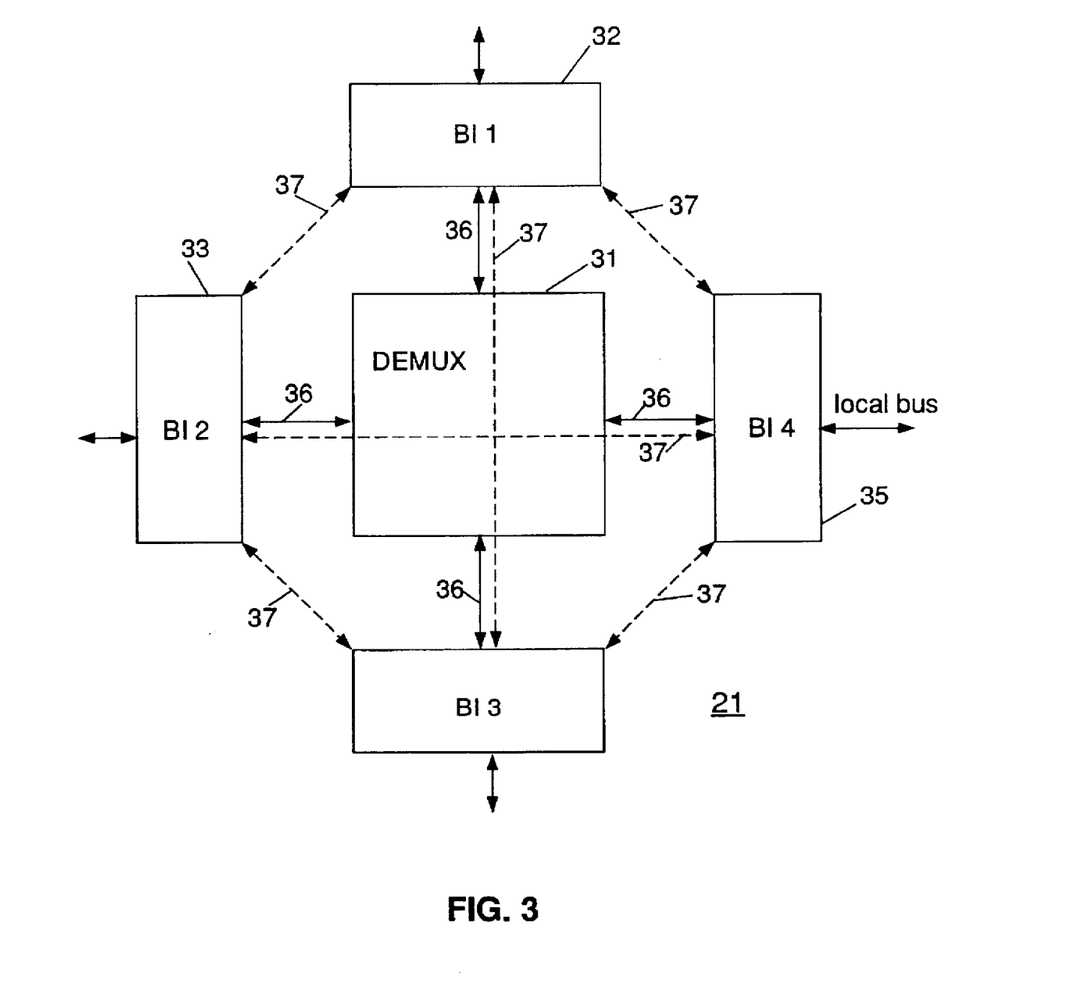
FIG. 3 shows in block functional form the elements of the router included in FIG. 2.

As shown in FIG. 3, the router 21 consists of 5 functional modules: one central DEMUX (Demultiplexer/Multiplexer)

module 31 that performs switching between the buses and four separate BI (Bus Interface) units 32-35 that perform bus protocol conversion (bridging), arbitration, buffering, and on-the-fly communication protocol specific data processing. Basically, the hardware of each BI would be a FPGA appropriately programmed.

Solid lines 36 between the BI modules 32, 33, 34 and 35 and DEMUX module 31 represent data/address lines (multiplexed) for encoded information for the selection of the switching path and for the signals for control of data and address transfer between BI units. Dashed lines 37 represent transfer request and grant lines between BI units and between the DEMUX module 31 and the BI modules 32-35.

DEMUX block 31 is advantageously a combinatorial four-port switching matrix. Each port configuration is controlled by three select bits which determine to which other port it will be connected, and what is the direction of transfer. These bits are driven by the BI module attached to the particular port of DEMUX. There is no possibility of conflicting assignments since the source BI port assigns active value to the select bits only after its request has been granted by destination, and the arbiter at the destination grants only one access at the time. Deadlock free arbitration at BI is achieved by assigning fixed priorities to requests from other BIs, and always backing off the request from the local bus of a BI if a remote request has already been granted.

Essentially, the router comprises an interconnection media for high speed buses with value added features for communication protocol acceleration. Each bus has its communication protocol and clock speed independent of other buses. Each bus can run at the clock speed up to 33 MHz. The router performs protocol and speed conversion between buses, and connects them in a non-blocking crossbar manner. The arbitration between multiple requests is performed in a distributed manner, i.e. each destination port has an independent arbiter which resolves requests for itself regardless of the requests for other ports of the router. Deadlock free arbitration is achieved by assigning fixed priorities to requests from other, and allows backing off the request from local bus if remote request has already been granted. The backoff is a mechanism built into bus protocol that enables suspension of bus transfer that has already been started. In the router design it is a necessary feature of local buses interconnected by the router, since if two agents on two different buses attached to the router start a transaction by asking for access to each other, they would wait indefinitely for each other by holding its own local bus and waiting for the other to release the local bus (thus resulting in deadlock), unless there is a backoff mechanism. All four buses attached to the router of the MCCP have this backoff feature. The router can also perform data touching on-the-fly processing of communication PDUs (Protocol Data Units) transferred between the buses and store the results in accumulators.

Each one of the buses connected to the DEMUX can perform read or write access to any other destination bus. The two agents involved in a data transfer through the DEMUX are the source bus and the destination bus. The source bus initiates operation. Non-conflicting accesses can be performed concurrently due to the crossbar non-blocking interconnection structure. The path selection is performed by address decoding. Each source assigns a portion of its address space to each one of its destinations.

The interconnected buses may have multiplexed or demultiplexed data and address. The router is responsible for interpreting address and data information of the source bus and appropriately delivering these two types of information on destination buses.

The router arbitrates transfer requests for target buses between local units on the bus and other buses interconnected by the router. Once the particular request is granted, the router follows the transaction through till the completion of the bus transfer, i.e. the router transactions are non-preemptive. The transactions between the buses can be single 32-bit word or bursts of up to 16 words.

Figure 4:
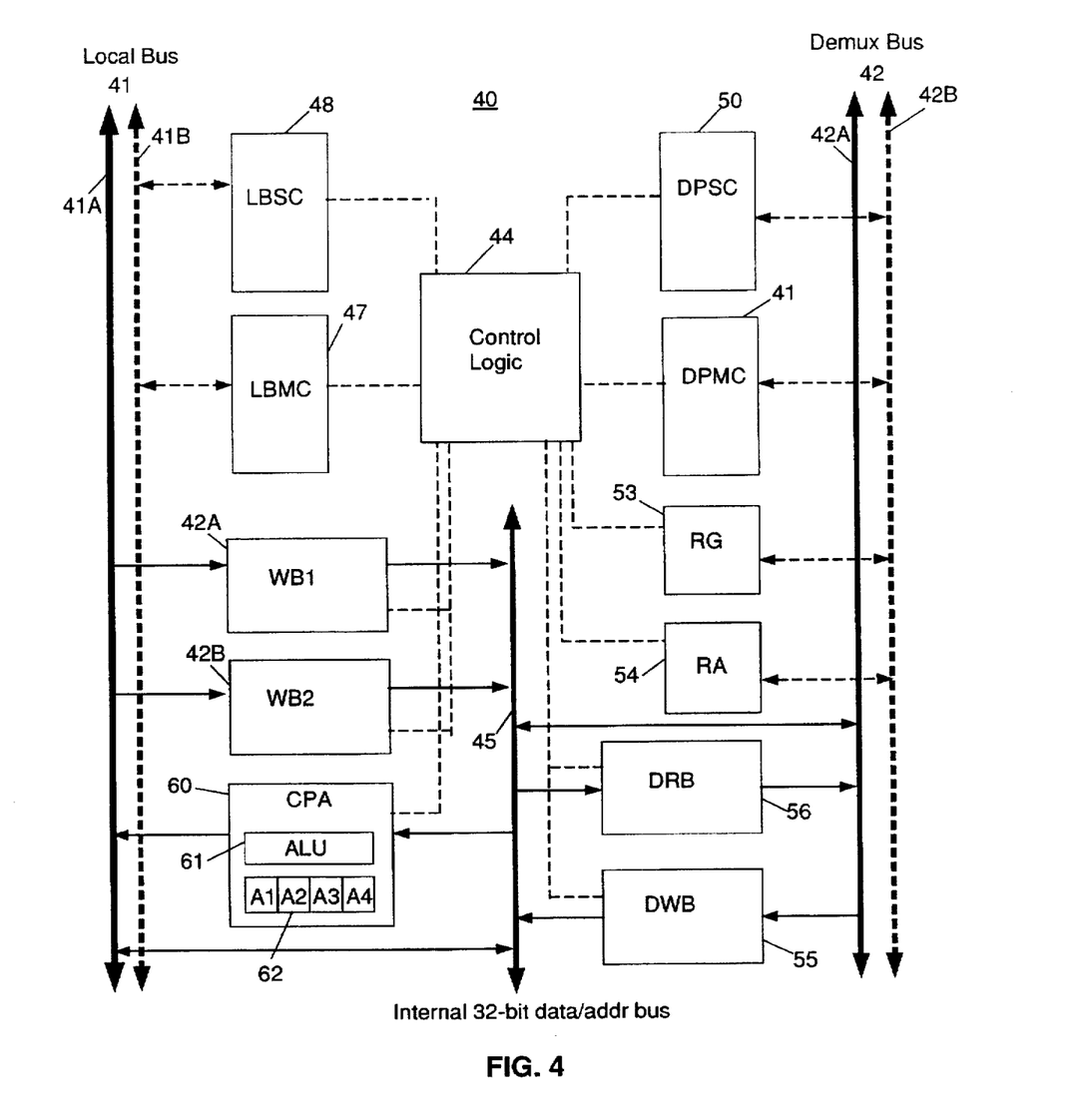
FIG. 4 shows the functional architecture of the bus interface (BI) units of the kind included in FIG. 3.

The basic structure of a Bus Interface (BI) unit 40 included in the router in accordance with an illustrative embodiment is shown in FIG. 4. Not shown are the various processing modules and input/output terminal devices that are attached to the local bus 41 that are either the destination of data being supplied to the unit or the source of data being supplied from the unit. Also not shown are the various external memories that may be associated with the BI and that would be accessed via the various buffers included in the BI. The local bus 41 and the remote or demux bus 42 that connects to the DEMUX unit 31 of FIG. 3 each comprise a data line and a control line, the data lines are the solid lines and the control lines are the dashed lines, shown by lines 41A, 41B and 42A and 42B, respectively. The BI includes a control logic unit 44 that receives the control signals from the local and remote bus control lines 41B and 42B and distributes them appropriately. The BI also includes an internal bus 45 that receives data signals from the buses and distributes them appropriately.

Various other units are typically included within the BI. The local bus master controller (LBMC) 47 uses control signals supplied from the control logic unit 44 to control which of the modules or terminal devices attached to the local bus is allowed to connect thereto. The local bus slave controller (LBSC) unit 48 interprets the local bus cycles and generates at appropriate times the request for connection of the data line of the local bus to the data line of the remote bus. The Demux port slave controller (DPSC) 50 acts to control the transfer of data to/from other Bus Interface units when the instant BI is acting as the source of the transaction. The Demux port master controller (DPMC) 51 acts to control the transfer of data to/from other BIs when the instant BI is acting as the destination of the transaction.

Also included are write buffers (WB) of which two 51A and 51B are shown for the temporary storage of data supplied by the local data bus line for transfer to the remote bus. Also included is a remote request generator (RG) 53 that generates a transfer request in connection with the transfer of data from a device attached to the instant B1 unit connected to the Demux to another BI unit connected to the DEMUX. Also included is the remote request arbiter RA 54 that arbitrates requests from other BI units interfaced. Additionally, the Demux Write Buffer 55 and the Demux Read Buffer 56 are included for the temporary storage of data from or for the DEMUX data bus 42A when the data bus 71A has stringent timing requirements that make such temporary storage desirable.

Additionally, the BI that is attached to the communications processor CP of the MCCP that executes transport protocol processing for the MCCP would include a communication protocol accelerator CPA 60 that includes an arithmetic logic unit (ALU) 61 and four accumulators 62 to perform data touching on-the-fly so that checksum calculations can be performed for up to four protocol data units within the same time period.

Each BI unit is run at the speed of the bus to which it is interfaced and the communication between each BI and the port of the router to which it is connected is performed in an asynchronous two-way handshaking manner, thus making the clock rates of the interconnected buses independent of one another.

Returning now to FIG. 2, as previously mentioned, since the µPD 93401 in the ATM SAR 22A used in the illustrative embodiment only provides segmentation and reassembly for the AAL-5 protocol and since it is felt that most multimedia workstations will need separate AALs for each of different media types, a separate AAL engine was designed to provide segmentation and reassembly for the non-AAL 5 traffic. It was also felt that one of the most important AALs for multimedia is still undefined: namely the video AAL.

Figure 5:
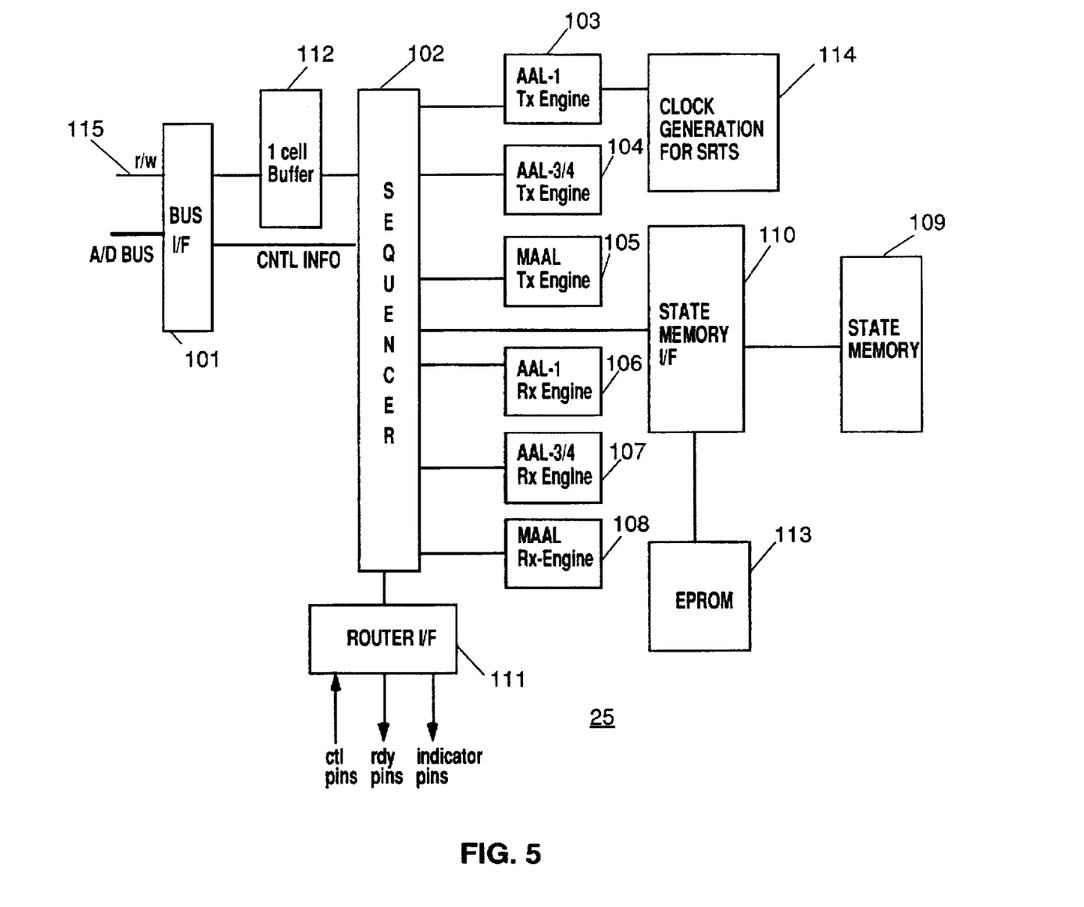
FIG. 5 shows the functional architecture of an AAL engine of the kind used in the MCCP of FIG. 2.

The architecture of the AAL engine 25 as shown in FIG. 5 was guided by the following requirements:

Scalability: the number of VCs it could support could be modularly increased and the design should scale to many thousand VCs.

Flexibility: the VCs could flexibly share the AALs without any constraints so all VCs may use the same AAL at any given time if the need arose.

Performance: The AAL Engine could snoop at the bus between the ATM chip and the router to augment the additional AAL functions without degrading the performance of the AAL 5 traffic.

The AAL Engine architecture is based on the fact that memory access times on SRAMs (15–20 ns) are typically much faster than the transmission time of an ATM cell (a few microseconds), so a judicious use of state memory to store the state of a VC and specialized state-machines for each AAL type to process and update the state information on a cell by cell basis promises scalability without any throughput degradation. The AAL engine has to process a cell within one cell transmission time. This requirement translates to giving the AAL Engine 1.4 microseconds to finish its AAL processing before the next cell (2.83 microsecond in both transmit and receive directions). However, the bus is operating at 1 Gb/s (30 ns cycle time), so even in the worst case, if we buffer up one cell into the AAL engine at the 1 Gb/s rate and deliver it to the µPD98401 or the router a few cycles after that, we should be able to keep the pipe full in both the directions as far as the ATM PHY chip is concerned. Initial simulation results show a worst case delay of about 3 cycles for processing the AAL data (which is 90 ns) so the requirements will be easily met. In other words, the number of VCs supported is limited by the address lines on the SRAM that can be supported on the board and not by any throughput limitation. The AAL Engine is fully able to process as many VCs as needed as it is only processing one cell at a time and finishes its processing before the next cell arrives.

The initial set of AALs that are implemented on the engine in the preferred embodiment of the invention are:

1. AAL-1 for CBR traffic. Details of this AAL are described in L135 document from ITU.
2. AAL 3/4 for Connectionless and Connection Oriented Data traffic. This AAL is useful for Internetworking or Router Applications and is also described in L135 document from ITU.
3. Multimedia AAL (MAAL) for multimedia stream oriented traffic. This is a subset of the Multimedia Transport Protocol (MTP). Its a very simple AAL which consists of a sequence number in the transmit direction and an ability to detect cell losses in the receive direction. Each 47 bytes of raw data has a one byte header. The header consists of a seven bit sequence number and a one bit start of a PDU indicator. The MTP module in the CP will take action in the event of lost cells (concealment for example).

The functional architecture of the AAL engine 25 is shown in FIG. 5. The main components of the engine include a bus interface unit 101 that snoops on the bus between the router and the ATM SAR chip, a sequencer unit 102 that serves to control and schedule the transmission of data flow into and out of the engine. Three sets of engine units are included, one for the AAL 1 (103,106) protocol, one for the AAL 3/4 (104,107) protocol, and a third MAAL (105,108) for the future AAL2 (or video) protocol, for each of the transmit and receive functions. An SRAM 109 that serves as the state memory is coupled to the sequencer by way of the state memory interface unit 110. It further includes a router interface unit 111 for receiving various control signals from the router and returning ready and indicator signals to the router. A one cell buffer 112 is interposed between the bus interface unit and the sequencer for temporary storage.

EPROM 113 is coupled to state memory 110 to serve as a table lookup for video concealment support of the multimedia AALs 105, 108. A synchronous residual time stamp clock recovery circuit 114 is included coupled to AAL-1 engine as is customary.

In the transmit direction, the typical data flow is as follows: The ATM SAR chip signals to the router indicating that it needs to transmit a cell. The router signals to the AAL engine that the transmitted cell needs AAL Engine processing by using a code word on the ctl pins of the router interface unit 111. The AAL Engine then goes and grabs data from the bus (the router puts up information about the AAL type and the channel number) of an appropriate virtual channel in the state memory 109. It also latches the information about the nature of the transfer by looking at the r/w pin on the bus interface 101 from the ATM SAR chip (r=Tx and w=Rx). The sequencer will then signal rdy to the router telling it to start transmission by way of the router interface 111. The sequencer will then go to state memory 109 and get the state information on that channel. The AAL Engine bus interface 101 then will grab data on the bus one word at a time and store it in the one-cell buffer. It will signal rdy to the router when it wants the next word. By the time the entire cell is stored in the buffer (47 or 44 raw data bytes) the relevant AAL Tx engine (AAL 1,2 or 3/4) will have computed the header for transmission. The AAL Engine will store raw bytes into the one cell buffer taking into account the byte alignment of the present transfers. Though the router will transmit on word boundaries the AAL engine will re-align the data before transmitting it to the ATM SAR chip. The information on how AAL 1 and AAL 3/4 headers are computed is available in the ITU document L135 and will not be described here. AAL2 processing consists of a sequence number update (N→N+1) and a start of TPDU bit (1=start, 0=continuation). Now the AAL engine will append the AAL header and transmit it to the ATM SAR chip. It does this by putting the relevant ATM cell on the data bus one word at a time and signaling to the router which then signals to the ATM SAR chip to accept the data.

In the receive direction, the same operation is repeated. The AAL engine will store an entire cell from the ATM SAR chip on its on-chip buffer memory, get state information based on the channel number that the ATM chip passes down on its A/D bus of bus interface 101 and the AAL type (which is sent by the ATM SAR chip when it first sends a request to the router and the router notifies the AAL engine to grab the AAL value). It then processes the AAL header on the cell for valid reception. When the router asks for the data, the AAL engine will send an indication down to the router if the cell was received correctly or incorrectly using the indicator pin on the router interface 111. If the cell was received incorrectly the AAL engine will also interrupt the CP to come and check the error registers using the indicator pin. The type of error and when the CP should be interrupted is all masked so the AAL engine does not interrupt the CP on the reception of all errored cells but only a setable few. Also for AAL2, concealment support is provided. If a cell is received and there has been a gap in reception, the AAL engine will provide the correct address to write the cell into physical memory by using an EPROM 113. The EPROM 113 is basically a table look up that gives a multiply by 47 operation. The router will always ask for the correct address to write the data into/from the AAL Engine first before requesting the data.

One of the novel features of this engine is the implementation of an AAL 105,108 suitable for Video Traffic. The video AAL sits under a more generic transport protocol for multimedia called the Multimedia Transport Protocol (MTP). One of the fundamental assumptions behind the MTP is that for some media data, such as video or voice, corrupted data or blocks of data with gaps in them is not necessarily data that needs to be thrown away and proper reconstruction or concealment strategies can restore the original data without having to retransmit. The AAL engine provides hardware support for the concealment strategies by deducing the length of a gap in transmission by looking at the sequence numbers of the incoming cells on a per VC basis, and then going to EPROM 113 to compute the new address that the data should be put in (if the gap is N cells and if the last cell was placed in memory location A then the new location of memory is A+N*47). This enables the media processor to play the data out without having to rearrange the cells in memory—which is always a slow time-consuming process.

By way of summing up the invention provides a multimedia computer and communications platform in which a high-capacity "router" connects the ATM interface circuit to various communications processing and media/data processing modules, including: an AAL engine, a communications processor (CP), a media processor (MP), a media playout buffer, a host bus interface and a local multimedia network with connected media devices. An ATM virtual circuit (VC) is established within the platform via signaling messages which are first processed by the ATM PHY/SAR interface and then routed to the CP via the router. Once the VC is established at the ATM level, the CP also handles local control functions within the MP to set up an appropriate path for the VC through the interconnect network to either host CPU or media devices. It also marshals appropriate protocol and media processing resources available in the form of AAL engines and MP adaptations. For example, an MPEG video VC would be routed through an AAL1, 2 or 5 engine and then into a playout buffer controlled by the MP and finally into an MPEG decoder connected to the local multimedia network (LMN) as indicated by the path 120 in FIG. 2. In a similar manner, an audio VC would be routed through an AAL1 engine, into a playout buffer controlled by MP, and through the LMN into an audio encoder/decoder as indicated by path 121 in FIG. 2. In contrast, a TCP/IP packet data VC would be routed through an AAL5 engine into the host CPU 26 connected through the host bus interface as shown by line 122 in FIG. 2. Note that, in general, an ATM multimedia session will involve multiple VCs containing video, audio, data, etc., so that the MCCP is required to provide multitasking support through each of the major resources outlined in FIG. 2.

It is to be understood that the specific forms of the various modules described are merely illustrative and that various modifications thereof can be made within the spirit and scope of the invention. In particular, the router can be used to interconnect any desired number of ports, for example a separate port for each of a variety of terminal devices.

What is claimed is:

1. A multimedia communications platform for location at a user premise to interconnect terminal devices with an ATM network comprising:

means for providing an ATM interface with an ATM network;

means for providing network related functions and overall management of the platform wherein said means for providing network-related functions further serves to offload transport protocols from a host CPU;

means for serving as an interface between media signals and media terminal devices;

and means for forming an interconnection network and routing incoming and outgoing information signals between each of said earlier-mentioned means by way of high speed buses with added features for communication protocol acceleration wherein said means for forming the interconnection network includes a core means for switching and a plurality of separate bus interface means for performing bus protocol conversion and said bus interface means further comprises a field programmable gate array that can be implemented to provide a preselected logic interface.

2. A multimedia communications platform in accordance with claim 1 further comprising:

means for concealing corrupt data received from the ATM network.

3. A multimedia communications platform in accordance with claim 9 further comprising:

means for storing the data received from the ATM network;

means for determining a position within the storage means that the data received from the ATM network is to be stored; and wherein said concealing means orders the data received from the ATM network within the storage means as if no corruption of the data took place and preserves a correct order of the data.

4. A multimedia communications platform in accordance with claim 3 wherein said determining means includes an Electrically Programmable Read Only Memory (EPROM) that contains a table of addresses.

5. A multimedia communications apparatus in accordance with claim 3 including:

an Electrically Programmable Read Only Memory (EPROM), connected to said concealing means, and containing a table of addresses and wherein said concealing module, upon receipt of data received from the ATM network, examines the table of addresses and determines where said received data is to be stored within a memory such that the received data is stored in the memory as if no corruption took place and a correct order of the data is preserved.

6. A multimedia communications platform for location at a user premise to interconnect terminal devices with an ATM network comprising:

means for providing an ATM interface with an ATM network;

means for providing network related functions and overall management of the platform wherein said means for providing network-related functions further serves to offload transport protocols from a host CPU;

means for serving as an interface between media signals and media terminal devices;

and means for forming an interconnection network and routing incoming and outgoing information signals between each of said earlier-mentioned means by way of high speed buses with added features for communication protocol acceleration wherein said means for forming the interconnection network includes a core means for switching and a plurality of separate bus interface means for performing bus protocol conversion and said bus interface means further comprises programmable logic which can be implemented to provide a preselected logic interface.

7. A multimedia communications platform in accordance with claim 6 wherein each of the bus interface means further comprises a field-programmable gate array that can be implemented to provide a preselected logic interface.

8. A multimedia communications platform in accordance with claim 6 further comprising:

a means for concealing corrupt data received from the ATM network.

9. A multimedia communications platform in accordance with claim 6 further comprising:

a means for storing the data received from the ATM network;

a means for determining a position within the storage means that the data received from the ATM network is to be stored; and wherein said concealing means orders the data received from the ATM network within the storage means as if no corruption of the data took place and preserves a correct order of the data.

10. A multimedia communications platform in accordance with claim 9 wherein said determining means includes an Electrically Programmable Read Only Memory (EPROM) that contains a table of addresses.

11. A multimedia communications platform in accordance with claim 8 further comprising:

an Electrically Programmable Read Only Memory (EPROM), connected to said concealing means, and containing a table of addresses wherein said concealing means, upon receipt of data received from the ATM network, examines the table of addresses and determines where said received data is to be stored within a memory such that the received data is stored in the memory as if no corruption took place and a correct order of the data is preserved.

* * * * *